(12) United States Patent
Oettle

(10) Patent No.: US 7,059,809 B2
(45) Date of Patent: Jun. 13, 2006

(54) CUTTING TOOL

(75) Inventor: Matthias Oettle, Riederich (DE)

(73) Assignee: Hartmetall-Werkzeugfabrik Paul Horn GmbH, Tübingen (DE)

( * ) Notice: Subject to any disclaimer, the term of this patent is extended or adjusted under 35 U.S.C. 154(b) by 68 days.

(21) Appl. No.: 10/250,363

(22) PCT Filed: Sep. 4, 2002

(86) PCT No.: PCT/EP02/09856

§ 371 (c)(1),
(2), (4) Date: Jul. 1, 2003

(87) PCT Pub. No.: WO03/022491

PCT Pub. Date: Mar. 20, 2003

(65) Prior Publication Data

US 2004/0052592 A1    Mar. 18, 2004

(30) Foreign Application Priority Data

Sep. 10, 2001  (DE) ................................ 101 45 667

(51) Int. Cl.
*B23B 29/04*  (2006.01)
(52) U.S. Cl. ........................ 407/11; 407/117
(58) Field of Classification Search ............... 407/117, 407/11, 30; 408/704; B23B 27/00, 29/04
See application file for complete search history.

(56) References Cited

U.S. PATENT DOCUMENTS

| 2,225,326 A | * | 12/1940 | Walker | ............................ 407/8 |
| 3,060,554 A | * | 10/1962 | Kirchner | ........................ 407/47 |
| 3,109,222 A |   | 11/1963 | Wiseman | |
| 3,192,603 A | * | 7/1965 | Greenleaf | ................... 407/103 |
| 3,368,257 A | * | 2/1968 | Andreasson | .................. 407/11 |

(Continued)

FOREIGN PATENT DOCUMENTS

DE  2713529  9/1978

(Continued)

*Primary Examiner*—Boyer D. Ashley
*Assistant Examiner*—Sara Addisu
(74) *Attorney, Agent, or Firm*—Roylance,Abrams,Berdo & Goodman, L.L.P.

(57) ABSTRACT

A cutting tool, in particular for the turning out of drillings, has a clamping piece (10) for fixing the tool in a clamp holder. The clamping piece (10) includes two clamping surfaces (30), which converge on each other in the direction of the one side (32) of the clamping piece (10). In the direction of the other side (34) of the clamping piece (10), the clamping surfaces extend into a roof-type surface (36). On the side of the clamping piece (10) facing away from the clamp holder, the clamping surfaces connect to a rod-like neck piece (12), which tapers in cross-section relative to the clamping piece (10). The free end of the clamping piece is connected to a cutting piece (14) as one piece, and is provided with a cutting edge (16) on the external end thereof to which a face (18) of the cutting piece (14) connects in the direction of the neck piece (12). A high degree of reinforcement for the neck piece and the cutting piece arranged on its free end with its blade or the blade edge is achieved. The neck piece (12) has two reinforcement pieces running along it, transverse to the plane of the cutting edge (16). The reinforcement pieces are reinforcing ribs (20, 22) which convergently taper in the direction of the cutting piece (14), are diametrically opposed in relation to the neck piece (12) and have their greatest width at the point of transition into the clamping piece (10).

14 Claims, 2 Drawing Sheets

U.S. PATENT DOCUMENTS

| | | | | |
|---|---|---|---|---|
| 3,548,473 | A | * | 12/1970 | Stein .......................... 407/117 |
| 3,663,116 | A | * | 5/1972 | Muller et al. ................ 408/143 |
| 3,912,413 | A | * | 10/1975 | Werther ....................... 408/143 |
| 4,021,134 | A | * | 5/1977 | Turner ......................... 408/204 |
| 4,470,732 | A | * | 9/1984 | Lindsay ....................... 407/104 |
| 5,085,540 | A | * | 2/1992 | Pagliaccio ..................... 407/11 |
| 5,405,221 | A | * | 4/1995 | Ducker et al. ............... 408/226 |
| 5,529,440 | A | * | 6/1996 | Schmidt ....................... 407/113 |
| 5,733,073 | A | * | 3/1998 | Zitzlaff et al. ............... 407/107 |
| 6,808,340 | B1 | * | 10/2004 | Travez et al. ............ 408/239 R |

FOREIGN PATENT DOCUMENTS

| | | | |
|---|---|---|---|
| EP | 0385280 | | 9/1990 |
| EP | 0947267 | | 10/1999 |
| EP | 0983814 | | 3/2000 |
| GB | 2228695 | A * | 9/1990 |

* cited by examiner

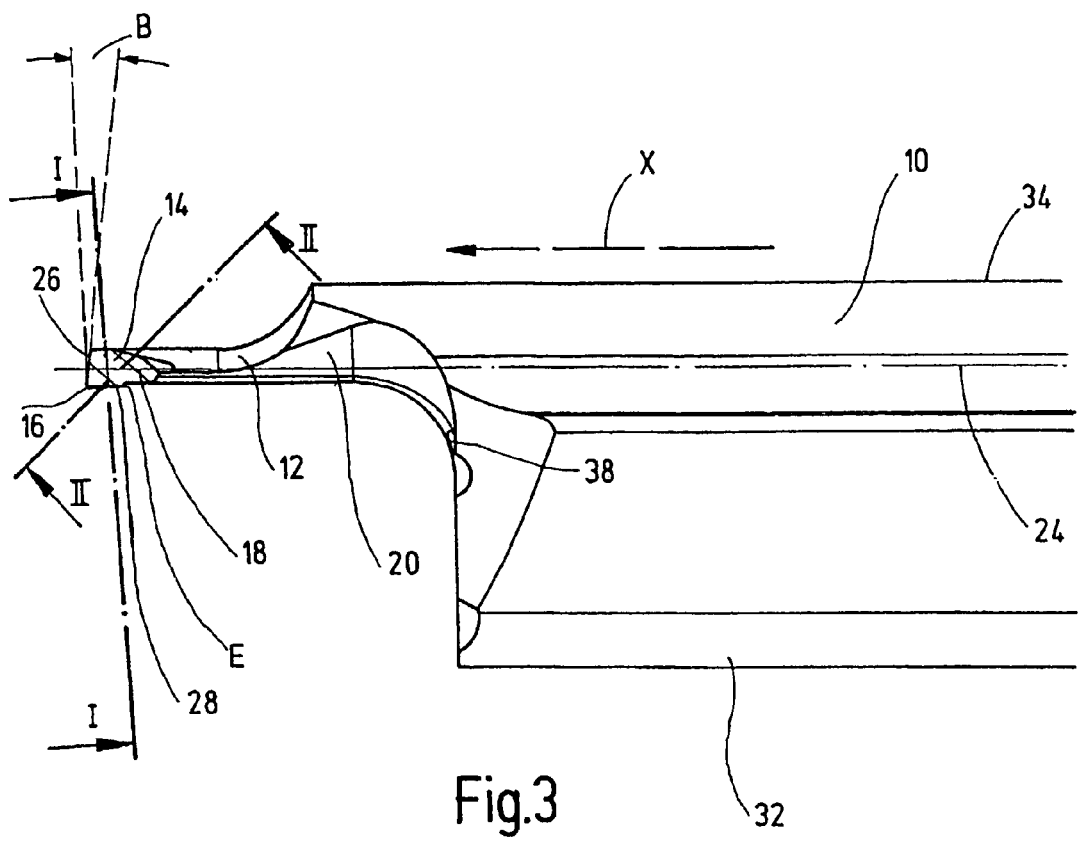
Fig.3
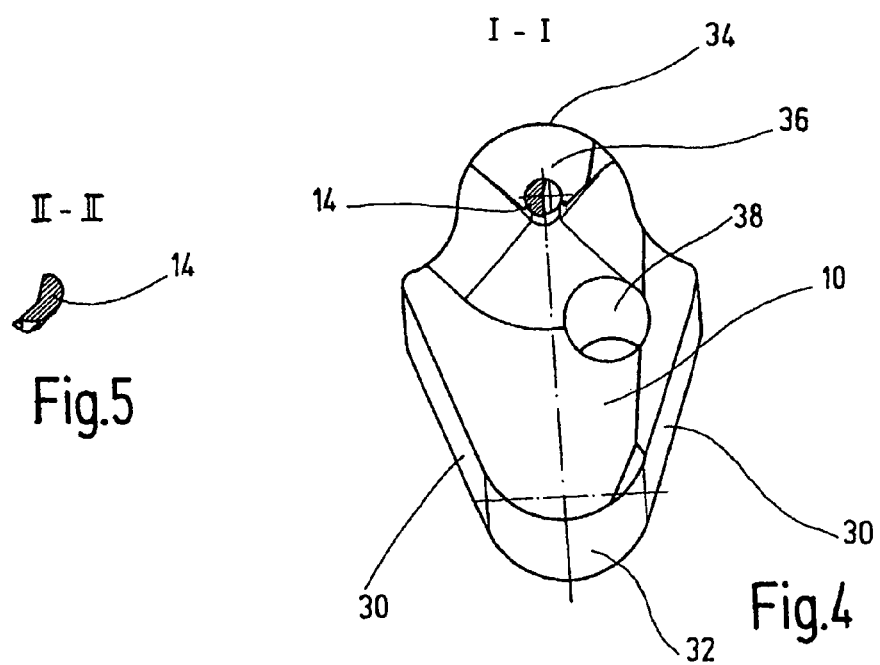
Fig.5
Fig.4

CUTTING TOOL

FIELD OF THE INVENTION

The present invention relates to a cutting tool, in particular for hollowing drill holes, having a clamp component for securing the tool in a tool holder. A neck component is tapered in cross section relative to the clamp component adjoining on the side of the clamp component facing away from the tool holder. An integral cutting component is provided at its extremity with a cutting edge which adjoins a face of the cutting component in the direction of the neck component. An inner cutter for machining the interior surface of drill holes is provided, for example, for cutting circumferential grooves into the drill hole wall, for precision machining of the drill hole wall by finish turning of the drill hole wall, for thread cutting in a bore hole, and the like.

BACKGROUND OF THE INVENTION

A comparable cutting tool is disclosed in EP-B-0 385 280. The cutting edge of the tool moves in a radial direction of advance during parting in machining the interior wall of a drill hole. In the process, the cutting edge must be positioned with the greatest accuracy possible in a diametral advance plane extending parallel to this radial direction of advance. Only with the cutting edge in this position is an optimal clearance angle obtained. Spacing the cutting edge away from the diametral advance plane results in clearance angles which may lead to unfavorable results in metal removal, such as vibration of the tool. For this reason, very precise rotary positioning of the tool in the tool holder must be achieved. The position of the tool must not vary appreciably when a load is applied to the tool. Distances between the cutting edge and this diametral plane are especially critical in the case of drill holes of small diameter which are to be machined, since, in this situation, even a slight variation of such spacing from zero results in major change in the clearance angle. To prevent such occurrence, the cutting tool disclosed in the European prior publication has on its clamp component clamping surfaces which at least to some extent converge toward each other. By these surfaces, the cutting tool may be secured on a processing machine, such as one in the form of a lathe. It is being possible to bring such converging surfaces in contact with correspondingly converging contact surfaces of the tool holder. By the mould closure referred to, a precisely defined rotary position of the disclosed clasp tool may be achieved in that radial enlargement in the seating recess in the tool holder. The radial projection on the shaft component of the clasp tool results through the action of the clamping means in rigorously defined application of the clamping surfaces of the radial projection to the contact surfaces of the enlargement. Change in the cutting position perpendicular to the diametral advance plane, when load is applied to the tool, is prevented, since the rotary position of the cutting tool relative to the tool holder is ensured in that application of the clamping surfaces to the application surface acts on a radius enlarged in relation to the radius of the receptacle bore.

To permit machining of drill holes of extremely small diameter, it has been recognized in the disclosed solution as advantageous to configure the clasping tool as one piece. Other advantages to this end are achieved if the clasping tool is formed of a cutting alloy, since, because of the large elasticity modulus of cutting alloy tools, the cutting edge remains precisely in the position originally set even under relatively high loads, so that change in the cutting position relative to the diametral advance plane when a load is applied is virtually eliminated.

It has been found, however, that, despite the measures described, the disclosed cutting tool approaches its limits when drill holes of extremely small diameter, less than one millimeter, such as 0.7 mm, are to be machined. Despite the advantageous tool holding, the integrated configuration of the tool, and its construction by use of cutting alloy materials, these disclosed measures do not make it possible to advance in this range of operation with boring diameters smaller than 1 mm to achieve the machining qualities desired.

EP-A-0 947 267 discloses a generic tool having a holder in which a plate with three cutting edges may be secured by means of a threaded connection. The free end of the holder on which the cutting tool may be seated has recesses by means of which reinforcing ribs are produced. Despite the holder components reduced by the cut-out recesses, such good reinforcement is obtained thereby for the cutting plate that vibrations impairing the machining quality during machining are absorbed and the holder is reinforced. Because of the flat application of the plate with three cutting edges on the end of the holder and the disclosed possibility of fastening by means of a screw connection, misadjustment of the machining edge may occur, and the configuration of the disclosed solution is so large that application of this for drill holes of extremely small diameter is not possible.

SUMMARY OF THE INVENTION

Objects of the present invention are to provide an improved cutting tool for the purpose of making it possible, while retaining the advantages of this tool, to machine drill holes of extremely small diameters, such as ones appreciably smaller than 1 mm, while maintaining high quality standards.

According to the present invention, a high degree of reinforcement is achieved for the neck component of the cutting tool. Also, the cutting component with cutting edge mounted on its free end is achieved in that, the retaining component has, extending transversely to the plane of the cutting edge, two reinforcing components such as reinforcing ribs. The reinforcing ribs taper as they converge in the direction of the cutting component. The reinforcing compounds are positioned diametrically opposite each other in relation to the retaining component, and assume their greatest width at the point of their transition to the shank component. In the case of a conventionally designed retainer, the reinforcing ribs of the cutting component permit sure absorption of the machining forces introduced into the cutting component by the retaining component into the shank component and then into the holding component to be associated with the machine. In particular, the reinforcing ribs counter vibrations occurring during machining with the cutting component, and retain the cutting component precisely in its required machining plane. Since the reinforcing ribs extend perpendicular to the plane of the cutting component with its cutting edge, they occupy little structural space. Because of their convergent configuration, the ribs permit engagement of the cutting components even in drill holes of small diameter.

In that the reinforcing ribs preferably are obtained from the neck component by a grinding process from the neck component and always have two different grinding patterns with different, preferably concave, radii of curvature in the direction of the cutting component, very high supporting forces can be achieved for the cutting component. The structural space required for the reinforcing ribs is optimized as well, so that a high degree of stiffening is achieved with geometrically small reinforcing ribs, which thus permit engagement of the cutting component also in drill holes for a machining process whose diameter is smaller than 1 mm, and 0.7 mm in particular.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 3 is an enlarged side elevation view of a portion of the front head part of the cutting tool of FIG. 1;

FIG. 4 is an end elevational view in section of the cutting tool taken along line I—I of FIG. 3; and FIG. 5 is an end elevational view in section of the cutting tool taken along line II—II of FIG. 3.

DETAILED DESCRIPTION OF THE INVENTION

Figure 1:
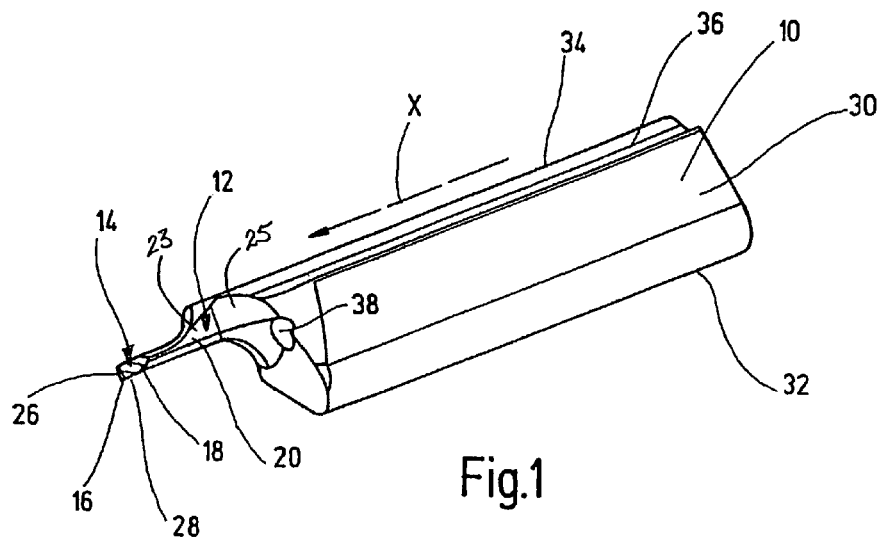
FIG. 1 is a perspective view of a cutting tool according to an embodiment of the present invention.

The cutting tool illustrated in the figures is used in particular for hollowing drill holes having a bore diameter less than 1 mm, preferably in the area of 0.7 mm. The cutting tool has a clamping component 10 for securing the tool in tool holder not shown. Use may be made, for example, of the tool holders as described in European Patent 0 385 280 issued to the applicant. The side of the clamping component 10 facing away from the tool holder is adjoined by a neck component 12 tapered in relation to the clamping component 10. The neck component 12 has integral with it, on its free end a cutting component 14 provided at its extremity with a cutting edge 16. Cutting edge 16 adjoins a face 18 of the cutting component 14 in the direction of the neck component 12. The direction of machining with the tool is indicated in FIGS. 1 to 3 by an arrow identified by an "X."

Figure 2:
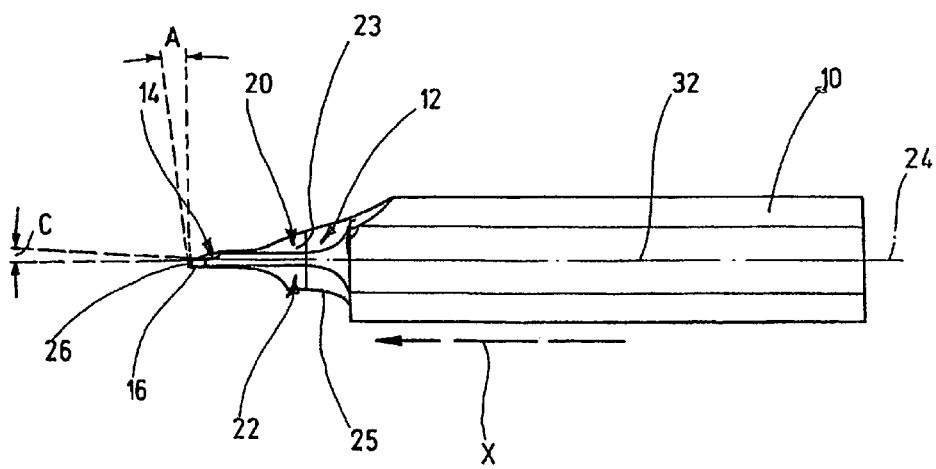
FIG. 2 is a bottom plan view of the cutting tool of FIG. 1.

As seen in FIG. 2 in particular, the neck component 12 has, extending along it transversely to the plane with the cutting edge 16, two reinforcing components in the form of two reinforcing ribs 20, 22. The two reinforcing ribs 20, 22 taper convergently in the direction of the cutting component 14. In addition, the two reinforcing ribs 20, 22 are positioned diametrically opposite each other relative to the neck component 12, in particular in relation to the longitudinal axis 24 of the cutting tool. The neck component 12 extends more or less in rotation symmetry around the longitudinal axis 24 in question. The two reinforcing ribs 20, 22 extend like vanes on both sides of the longitudinal axis 24 along the neck component 12. In addition, the reinforcing ribs 20, 22 reach their greatest width at the point of their transition to the clamping component 10. The clamping component may also be designated a shank or shank component of the cutting tool.

The two reinforcing ribs 20, 22, as well as the other geometric configurations of the cutting tool, are obtained in particular by a grinding process. The reinforcing ribs 20, 22 thus obtained from the neck component 12 each exhibits in the direction of the cutting component 14 two different grinding patterns 23, 25 with different, preferably concave, radii of curvature. To ensure a high degree of engagement depth for the cutting edge 16, the grinding patterns selected for the two reinforcing ribs 20, 22 accordingly have greater curvature in the direction of the cutting edge 16 than in the direction of the clamping component 10, that is, pattern 23 has a greater radius of curvature than that of pattern 25.

The free surface 26 of the cutting component 14 is situated at the front end in the direction of machining X, and is slanted backward at an angle A, preferably 5°, from the vertical (see FIG. 2). The respective front free surface 26 of the cutting component is, in turn, itself slanted backward at an angle B, preferably 8° (see FIG. 3). As is also to be seen from FIG. 2, the face 18 in turn is slanted backward at an angle C, preferably 5°, from the horizontal, specifically, in the direction of the clamping or shank component 10. In addition, the cutting edge 16 undergoes transition at its free end in the direction of machining X to a supporting surface 28 (see FIG. 3) which extends parallel to the direction of machining X. The outer circumferential surface of this supporting surface 28 projects beyond the neck component 12 by an amount of excess E. Consequently, by its excess E, the supporting surface and the cutting edge forms a kind of hook tool relative to the neck component 12.

The illustrations in FIGS. 1 and 4 show that the clamping component 10 has essentially two clamping surfaces 30 which converge toward each other in the direction of the bottom 32 of the clamping component 10 and which undergo transition to semicircular roofage 36. In this way, the clamping component 10 may be secured in a corresponding seat of a clamping component by an adjusting screw (not shown in detail). A clamping component such as this is described in greater detail in EP-B-0 385 280, and accordingly will not be discussed further at this point. In the area of the clamping component 10, which is bounded by the two clamping surfaces 30, a coolant feed channel 38 extends parallel to the direction of machining X. A cooling lubricant in particular may be fed by way of the coolant feed channel 38 in the direction of engagement of the cutting edge 16 with a tool to be machined (not shown). At the point at which the coolant feed channel 38 empties into the open, the neck component 12 is more greatly retracted relative to the clamping component 10 (see FIG. 3), than on the diametrically opposite point in the area of the top 34 of the cutting tool. A kind of domed support for the cutting component 14 proper with its cutting edge 16 is produced on the basis of the respective configuration, along with accompanying grinding patterns 23, 25 for the external outline of the cutting tool, at least in one diametral plane, as is illustrated in FIG. 2.

Hard alloys such as MG12, TN 35, T125, or TF45 have been found to be especially well suited. The cutting tool configuration also illustrated in the figures is that of a "right-hand" embodiment. A mirror-image configuration of the figures presented yields a corresponding "left-hand" embodiment, should such prove to be necessary for the machining purpose pursued.

While one embodiment has been chosen to illustrate the invention, it will be understood by those skilled in the art that various changes and modifications can be made therein without departing from the scope of the invention as defined in the appended claims.

What is claimed is:

1. A cutting tool, comprising:
   a clamping component for fastening to a tool holder, said clamping component having first and second clamping surfaces converging toward one another in a direction of one side thereof and a change in shape to a roofage in a direction of another side thereof;

a rod-shaped neck component tapered in cross section relative to said clamping component and adjoining a side of said clamping component;

a cutting component coupled to said neck component, and having a cutting edge on an outer end thereof extending in a cutting edge plane and a face adjoining said cutting edge in a direction of said neck component; and first and second reinforcing ribs on said neck component extending transversely to said cutting edge plane and tapering and converging toward said cutting component, said reinforcing ribs being positioned diametrically opposite one another relative to said neck component and having greatest widths thereof at transition points thereof to said clamping component, each of said reinforcing ribs being formed by grinding of said neck component and having two different concave grinding patterns with different radii of curvature in a direction of said cutting component.

2. A cutting tool according to claim 1 wherein
said grinding patterns have greater radii of curvature in the direction of said cutting component than in the direction of said clamping component.

3. A cutting tool according to claim 1 wherein
said cutting component comprises a free surface positioned on a foremost end thereof in a machining direction and tilted backward from a vertical by a first angle.

4. A cutting tool according to claim 3 wherein
said first angle is 5 degrees.

5. A cutting tool according to claim 3 wherein
said free surface is tilted backward from said cutting edge by a second angle.

6. A cutting tool according to claim 5 wherein
said second angle is 8 degrees.

7. A cutting tool according to claim 1 wherein
said face is tilted backward from a horizontal in a machining direction by a tilt angle.

8. A cutting tool according to claim 7 wherein
said tilt angle is 5 degrees.

9. A cutting tool according to claim 1 wherein
said cutting edge has a free end with a supporting surface in a machining direction, extending parallel to said machining direction and projecting beyond said neck component by an amount of an excess.

10. A cutting tool according to claim 1 wherein
said clamping surfaces converge toward one another in a direction of a bottom of said clamping component; and
said roofage is semicircular and is in a direction of a top of said clamping component.

11. A cutting tool according to claim 10 wherein
a coolant feed channel extends parallel to a machining direction in an area of said clamping component bounded by said clamping surfaces.

12. A cutting tool according to claim 1 wherein
said neck component recedes farther into said clamping component as said neck component transitions into said clamping component than at a point said coolant feed channel opens onto a diametrically opposite side.

13. A cutting tool according to claim 1 wherein
said roofage is a convex projection on said clamping component.

14. A cutting tool according to claim 1 wherein
said grinding patterns define curved surfaces facing radially outwardly relative to a longitudinal axis of said neck component.

* * * * *